United States Patent [19]

Ranjan et al.

[11] Patent Number: 5,108,781
[45] Date of Patent: Apr. 28, 1992

[54] PROCESS FOR MANUFACTURING SELECTIVELY TEXTURED MAGNETIC RECORDING MEDIA

[75] Inventors: Rajiv Y. Ranjan, Edina, Minn.; David N. Lambeth, Webster, N.Y.

[73] Assignee: Magnetic Peripherals Inc., Minneapolis, Minn.

[21] Appl. No.: 675,334

[22] Filed: Mar. 26, 1991

Related U.S. Application Data

[62] Division of Ser. No. 491,586, Mar. 12, 1990, Pat. No. 5,062,021.

[51] Int. Cl.$^5$ ................................................ B05D 3/06
[52] U.S. Cl. .................................. 427/53.1; 427/128; 427/130; 427/131; 427/132
[58] Field of Search ............... 427/128, 130, 131, 132, 427/48, 53.1

[56] References Cited

U.S. PATENT DOCUMENTS

| | | | |
|---|---|---|---|
| 4,326,229 | 4/1982 | Yanagisawa | 360/135 |
| 4,337,288 | 6/1982 | Takenaka et al. | 427/130 X |
| 4,522,848 | 6/1985 | Patel | 427/131 |
| 4,609,964 | 9/1986 | Sobel | 360/135 |
| 4,626,941 | 12/1986 | Sawada et al. | 360/135 |
| 4,698,251 | 10/1987 | Fukuda et al. | 428/64 |
| 4,699,835 | 10/1987 | Takeuchi et al. | 428/65 |
| 4,996,622 | 2/1991 | Takatsuki et al. | 360/135 |

FOREIGN PATENT DOCUMENTS

| | | |
|---|---|---|
| 62-262227 | 11/1987 | Japan . |
| 63-34723 | 2/1988 | Japan . |
| 2221425 | 7/1990 | United Kingdom . |

Primary Examiner—Bernard Pianalto
Attorney, Agent, or Firm—Frederick W. Niebuhr; Edward P. Heller, III

[57] ABSTRACT

Magnetic recording media are controllably textured, particularly over areas designated for contact with data transducing heads. In connection with rigid media, the process includes polishing an aluminum nickel-phosphorous substrate to a specular finish, then rotating the disc while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and height of the rims are controlled primarily by laser power and firing pulse duration. The shape of individual laser spots can be altered by varying the laser beam inclination relative to the disc surface. On a larger scale, the frequency of firing the laser in combination with disc rotational speed controls the pattern or arrangement of laser spots. The smooth, rounded contours of the depressions and surrounding rims, as compared to the acicular character of mechanically textured surfaces, is a primary factor contributing to substantially increased durability of laser textured media.

19 Claims, 3 Drawing Sheets

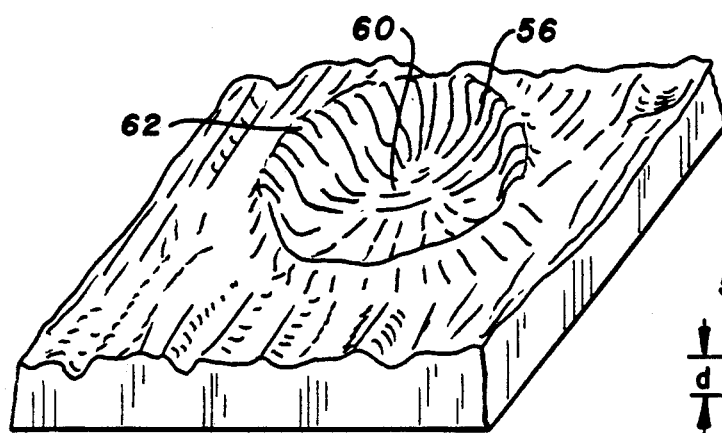
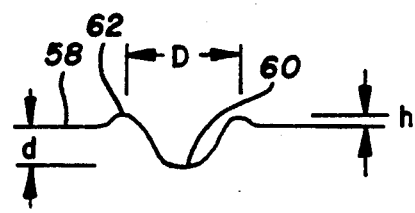
FIG.4      FIG.5
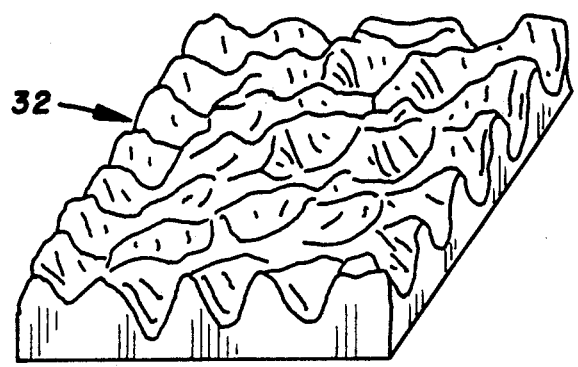
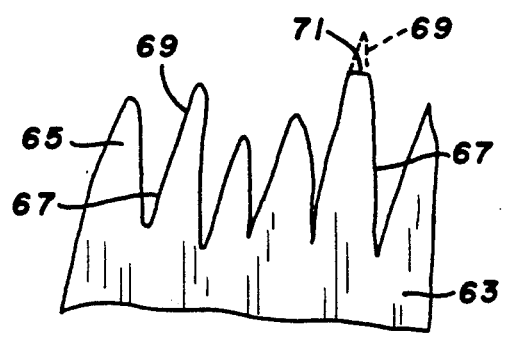
FIG.6
PRIOR ART
FIG.8
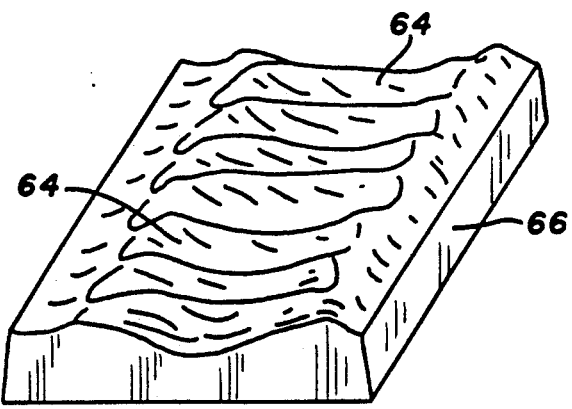
FIG.7

PROCESS FOR MANUFACTURING SELECTIVELY TEXTURED MAGNETIC RECORDING MEDIA

This is a divisional of copending application Ser. No. 07/491,586, filed on Mar. 12, 1990, now U.S. Pat. No. 5,062,021.

BACKGROUND OF THE INVENTION

The present invention relates to the recording, storage and reading of magnetic data, and more particularly to rotatable magnetic discs used in cooperation with magnetic transducing heads and having at least portions of their data recording surfaces textured for contact with the transducing heads.

Magnetic discs and disc drives are well known for their utility in storing data in magnetizable form. They typically employ one or more discs rotated on central axis, in combination with data transducing heads positioned at close proximity to the recording surfaces of the discs and moved generally radially with respect to the discs. Generally these devices are of two kinds. The first uses flexible or "floppy" discs, with associated transducing heads contacting the recording surfaces at all times. The second type employs rigid discs rotated at much higher speeds than flexible discs. The transducing heads, during reading and recording operations, are maintained at a controlled distance from the recording surface, supported on a "bearing" of air as the disc rotates. The transducing heads contact their associated recording surfaces whenever the discs are stationary, when they accelerate from a stop, and during deceleration just before coming to a complete stop.

While all such magnetic recording devices experience at least some wear, the problem is particularly serious for the rigid discs and associated heads. This is due in part to the stricter design tolerances associated with rigid discs and heads, arising from the ever-present challenge of increasing the density of data stored on disc recording surfaces. It is considered desirable during reading and recording operations to maintain each transducing head as close to its associated recording surface as possible, i.e. to minimize the "flying" height of the head. A smooth, specular recording surface is thus preferred, as well as a smooth opposing surface of the associated transducing head. This permits closer proximity of the head to the disc, and more predictable and consistent behavior of the air bearing supporting the head.

However, if the head surface and recording surface are too flat, the precision match of these surfaces give rise to excessive stiction and friction during the start up and stopping of the disc, causing wear to the head and recording surface which eventually can lead to a head crash.

In recognition of this difficulty, the recording surfaces of magnetic discs often are intentionally roughened to reduce the head/disc friction. In particular, rigid disc can be formed with an aluminum substrate polished flat and plated with a nickel-phosphorous alloy. The alloy is polished to a substantially specular finish, e.g. to a roughness of less than 0.1 microinch. The disc is then rotated between opposed pressure pads or rollers which support a cloth or paper coated with silicon carbide (SiC) or other suitable grit of a size predetermined to yield roughness peaks of about one microinch. Peaks thus created tend to be jagged and have sharp edges, and are difficult to control in size, form and location as these factors depend largely upon the nature of the grit and the direction which the disc moves relative to the pressure pads or rollers.

In U.S. Pat. No. 4,698,251 (Fukuda et al), a polishing paper is applied to magnetic discs to form circumferential scratch marks having depths from 0.0002 to 0.1 microns into the nickel-phosphorous alloy layer coated onto an aluminum substrate. Following polishing, a chromium layer and a cobalt nickel magnetic layer are formed on the disc. In another embodiment, a nickel-phosphorous layer is deposited onto an aluminum substrate, scratches are formed in the nickel-phosphorous layer, then a cobalt-phosphorous magnetic layer is deposited on the nickel-phosphorous layer.

As an alternative to using grit paper or cloth, U.S. Pat. No. 4,326,229 (Yanagisawa) discloses a protective film layer for covering a smooth recording medium layer of a magnetic disc. To form the protective coating, a solvent is applied in a spin coating process to form a film with radially extending sinusoidal jogs or undulations to increase surface roughness, which is said to reduce head wear.

While each of the above approaches can be satisfactory under certain circumstances, all require compromise between the competing goals of reduced head/disc friction and minimum transducer flying height, and none affords the desired amount of control over surface texture.

Therefore, it is an object of the present invention to provide a magnetic recording medium in which peaks and indentations forming surface roughness are of a controlled size and shape for substantially reduced flying height, improved recording density, and improved transducing head and disc wear characteristics.

Another object of the invention is to provide a process for controlling the texture of a strictly delineated portion of a magnetic disc recording surface while providing a specular finish on the remainder of the recording surface.

Another object is to provide a process for controllably forming the surface texture of a magnetic data recording disc through control of the size and spacing between generally circular individual discontinuities providing texture.

Yet another object is to provide a magnetic recording disc with designated surface areas for contact with data transducing heads, which designated areas exhibit substantially enhanced friction and wear characteristics.

SUMMARY OF THE INVENTION

To achieve these and other objects, there is provided a process for manufacturing magnetic media operated in conjunction with magnetic transducing heads for the recording and reading of magnetic data. The process includes the steps of:

forming a specular substrate surface on a non-magnetizable substrate body, the substrate surface being substantially planar and having a nominal roughness;

depositing a magnetizable film over the substrate surface as a layer substantially uniform in thickness; and concentrating energy selectively upon a plurality of locations over a designated treatment area on either the substrate surface or the recording surface, to controllably alter the topography of the selected surface at each of the locations, spacing the adjacent locations apart from one another a distance substantially less than the length and width dimensions of a magnetic transducing head positioned proximate the magnetic film for recording and reading magnetic data, the roughness of the selected surface throughout the designated treatment area being at least twice the nominal roughness.

Preferably the concentrated energy is provided by a pulsed or timed laser which forms at each location a rounded center depression extending inwardly of a nominal surface plane of the selected surface, and a generally circular and rounded rim surrounding the center depression an extending outwardly of the nominal surface plane. By rotating the disc at a controlled rate corresponding to the pulsed laser frequency, a ring comprised of a series of depressions and rims is formed, with repeated rings combining to form an annular band. Preferably, the band is located radially inward of a data reading and recording area of the magnetizable film. This approach is particularly advantageous in connection with rigid discs and flying heads, in which the inner band is designated as a head contact area and the remaining surface area is always separated from the head by a bearing of air.

The substrate can include a rigid aluminum disc plated or otherwise coated with a layer of a nickel-phosphorous alloy, in which case the laser treated locations preferably are formed in the alloy layer but alternatively can be formed in the aluminum. As further alternatives, however, the laser marks including depressions and rims can be formed in any succeeding layer, e.g. a chromium underlayer, or a cobalt chromium or cobalt nickel magnetic recordinq layer. When the laser marks are formed in the aluminum or nickel-phosphorous alloy layers, succeeding layers tend to replicate them.

Laser surface texturing provides a degree of control previously unavailable in grit cloth or paper texturing. The accuracy of the laser enables a precise delineation of the textured area boundaries. The laser power, pulse length and focusing are variable to control the size and profile of laser spots or marks. Finally, the pulse frequency, in conjunction with the rotation or other relative translation of the disc, can be controlled to determine the spacing among adjacent marks. The rotund or rounded nature of the laser marks improves the degree of control in the topography of the magnetic recording media, to dramatically improve wear characteristics, in particular as measured by CSS (contact start-stop) testing in conjunction with measuring the coefficient of friction and self-excited head/gimbal vibration energy. The high degree of control of the pulsed laser produced depressions and rims allows the flying height of the transducing head to be reduced, even over the designated treatment area. Restricting the treatment area only to a specific landing zone allows the recording areas to be extremely smooth, thus to allow further reduction in head flying height in the recording areas, resulting in improved recording density.

Further in accordance with the present invention, the process can be applied to a flexible magnetic disc, tape or other medium in which the recording surface is generally in contact with the transducing head at all times, and thus the designated treatment area is substantially all of the recording surface. While controlled texturing of flexible discs is not considered as critical as it is with rigid discs, the rounded marks nonetheless can provide an overall surface texture with reduced friction and improved head and disc wear characteristics. In a contact recording system such as this, the controlled, rounded marks can be used to control head/disc spacing while reducing friction and wear. In connection with rigid as well as flexible discs, the generally circular depressions and surrounding rims are believed to further reduce frictional wear by acting as areas of collection for debris and any lubricant coated onto the disc.

BRIEF DESCRIPTION OF THE DRAWINGS

For a further understanding of the above and other features and advantages, reference is made to the following detailed description and drawings, in which:

FIG. 4 is a substantially enlarged perspective view of a laser mark formed in the surface;

FIG. 5 is a schematic view of the profile of the laser mark;

FIG. 6 is a perspective view similar to that of FIG. 4, showing part of the transducing head contact area;

FIG. 7 is a perspective view similar to that in FIG. 6 showing an alternative surface texture;

FIG. 8 is a schematic view showing a profile of a mechanically textured surface.

DETAILED DESCRIPTION OF THE PREFERRED EMBODIMENTS

Figure 1:
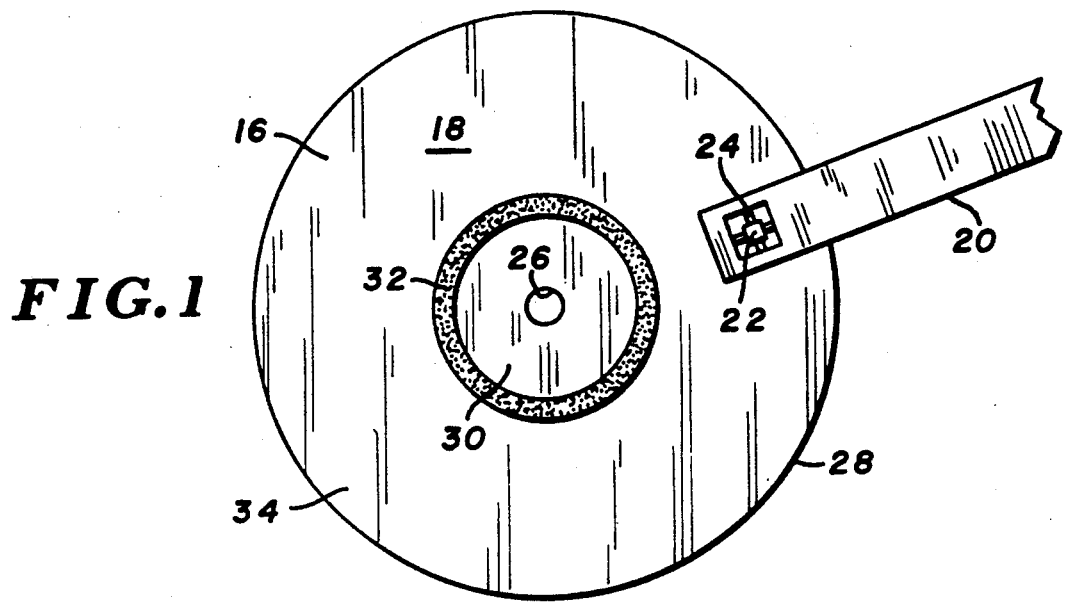
FIG. 1 is a plan view of a rotatable rigid magnetic recording disc and a transducing head supported generally for movement radially of the disc, wherein the disc recording surface includes a designated transducing head contact area formed in accordance with the present invention.
Figure 2:
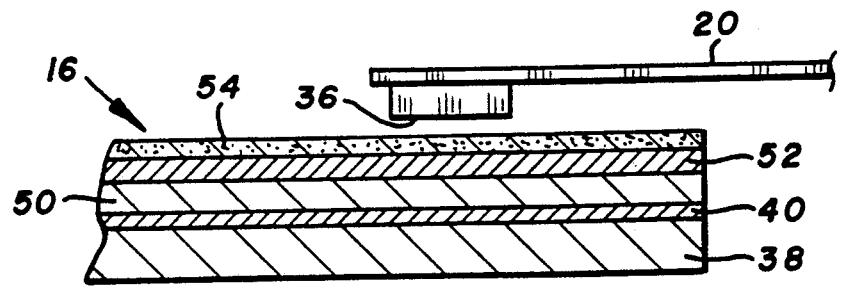
FIG. 2 is an enlarged partial sectional view of the magnetic disc of FIG. 1.

Turning now to the drawings, there is shown in FIGS. 1 and 2 a data recording medium, namely a rigid magnetic disc 16 rotatable about a vertical axis and having a substantially planar and horizontal upper surface 18. A transducing head support arm 20 is part of a carriage assembly (not shown) supported for linear reciprocation radially of disc 16. A magnetic transducing head or slider 22 is supported by arm 20 through a head suspension 24, for movement relative to the disc along with the arm. Suspension 24 does not support the head rigidly relative to the arm, but rather allows for gimballing action of the head, i.e. limited vertical travel and limited rotation about pitch and roll axes.

At the center of disc 16 is an opening 26 to accommodate a vertical spindle of a disc drive, not shown, used to rotate the disc. Between opening 26 and an outer circumferential edge 28 of the disc, upper surface 18 is divided into three annular sectors: a radially inward sector 30 used principally for clamping the disc with respect to the spindle, a head contact region or area or band 32, and a data storage region or area 34.

Whenever disc 16 is at rest, or rotating but at a speed substantially below its normal operating range, head 22 is in contact with upper surface 18. But when the disc rotates at least near its operating range, an "air bearing" is formed by air flowing between head 22 and upper surface 18 in the direction of disc rotation, which supports the head in parallel, spaced apart relation to the recording surface. Typically, the distance between a planar bottom surface 36 of head 22 and recording surface 18, sometimes referred to as the "flying height" of the head, is about ten microinches or less. Preferably, the flying height is low, to position head 22 as close to recording surface 18 as possible. The closer the transducing head, the more data that can be stored on disc 16.

As mentioned above, arm 20 moves to selectively position head 22 over the recording surface. In this connection it is to be appreciated that a rotary arm, although moving head 22 in an arcuate path, could be used in lieu of arm 20 to accomplish substantially the same result. The radial position of head 22 is controlled before and after reading and recording operations, as well as during such operations. More particularly, during such operations head 22 while supported on the air bearing is selectively positioned radially across data storage area 34 to either record or retrieve data at a particular location on the disc. After such operations and during deceleration of disc 16, arm 20 is moved radially inward to position head 22 directly over head contact area 32. Thus, by the time disc 16 decelerates sufficiently to permit the head to engage the upper surface, head 22 already is aligned with the head contact area. Prior to the next recording or retrieval operation, acceleration of disc 16 from stop occurs with head 22 initially engaged with area 32. Arm 20 is not actuated to remove the head radially from area 32 until the head is supported by an air bearing, i.e. free of the disc.

Because upper surface 18 of the disc includes designated data storage and head contact areas, the surface contours or texture of each area can be formed in accordance with its function. More particularly, data storage area 34 preferably is polished or otherwise finished to a highly smooth, specular finish, having a surface roughness of at most 0.1 microinch, to permit the desired low flying height for head 22. A further advantage of the specular finish is that, as compared to the textured surface, foreign particles are readily observed, which enhances optical inspection of disc 16. Roughness in this context means the height of the highest peaks above a nominal horizontal plane of the surface.

By contrast, head contact area 32 has an a roughness of at least 0.5 microinches. The increased surface roughness of the head contact sector in relation to the remainder of upper surface 18 is achieved by a controlled texturing of the disc during its manufacture. As seen from FIG. 2, disc 16 is formed of a multiplicity of layers including a substrate, a recording layer and a protective cover layer over the recording layer.

More particularly, disc 16 is formed first by polishing, grinding or otherwise machining an aluminum substrate disc 38 to provide a substantially flat upper surface of the substrate. Next, a nickel-phosphorous (Ni-P) alloy 40 is plated onto the upper surface of the aluminum disc, preferably evenly to provide a substrate layer substantially uniform in thickness, e.g. about 10 microns. Following plating, alloy layer 40 is polished to a roughness of generally less than 0.1 microinch. For example by a silicon carbide grit lapping process. This normally involves a cloth or paper carrying the grit, and can also involve a liquid slurry containing grit in combination with a cloth or paper of desired. Such processes are known and not further discussed herein.

The preferred stage for the texturing operation is immediately after polishing and cleaning alloy layer 40. Texturizing is accomplished with an apparatus illustrated schematically in FIG. 3, including a spindle 42 for supporting disc 16, and a pulsed mode Nd-YAG (yttrium aluminum garnet) laser 44 supported above the disc and generating a pulsed laser beam 46 selectively focused on the upper surface of Ni-P layer 40. Laser 44 is an ESI model 44 laser trimming system available from ESI, Inc. of Portland, Oregon. Laser 44 is fired at a selected frequency onto the disc while spindle 42 is rotated, thereby rotating the disc a well. Shown in a vertical orientation, laser 44 preferably is supported by structure (not shown) which permits a tilting of the laser away from the vertical if desired. The support structure further enables a controlled stepped movement of laser 44 radially of the disc and spindle. The specific apparatus for rotating the spindle and for supporting, orienting and stepping the laser is not shown or discussed in detail as such equipment is known in the art and not directly concerned with the invention. Rather, the invention lies in the manner in which such equipment is used to provide a controlled, strictly delineated head contact area 32.

A salient feature of the present invention is the consistent, uniform texture over the entire head contact area. In achieving uniformity, two levels of control are involved: a micro level concerned with individual laser marks or spots, and a macro level concerning the pattern or arrangement of multiple laser spots. The nature of the individual laser spots is controlled primarily by the intensity or peak energy at which laser 44 is fired, and the duration of each firing, i.e. the pulse width. Somewhat secondary added factors include the way in which beam 46 is focused, and the angle of approach. The vertical direction of the beam upon horizontal substrate surface 48 as shown in FIG. 3, i.e. an approach angle of 90 degrees, yields substantially circular spots, while an inclined angle, i.e. 45 degrees, would yield somewhat elliptical or oblong spots.

As for the pattern or arrangement of spots, the primary control factors include the frequency of repeated firings of laser 44, the speed of disc rotation, and the amount of radial stepping of the laser.

Figure 3:
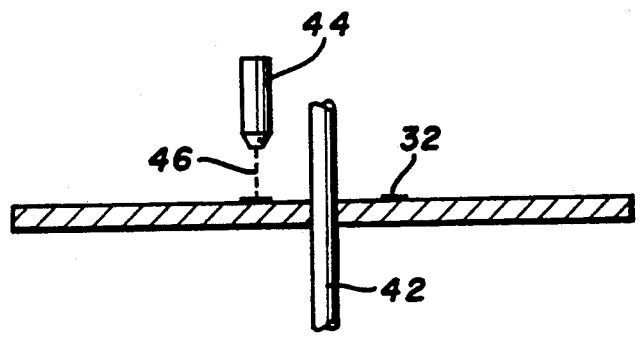
FIG. 3 is a schematic view of an apparatus for controllably texturing the disc in FIG. 1 to provide the head contact area.

One preferred texturing approach is to orient laser 44 vertically as shown in FIG. 3, and to maintain it stationary while rotating disc 16 and firing the laser at a selected frequency, coordinated with the disc rotational velocity to provide a selected distance between consecutive spots. A single rotation of the disc results in a ring of such spots concentric on central opening 26. Next, laser 44 is displaced radially by a desired inter-ring pitch, and with its vertical orientation maintained, fired at the predetermined frequency and phase relative to disc rotation. These steps are repeated until a plurality of concentric rings of laser spots form head contact area 32 as an annular band of a width equal to the pitch times the number of rings.

With the nickel-phosphorous alloy layer thus selectively texturized, the remaining layers, illustrated in FIG. 2, are applied, preferably by vacuum deposition, to complete disc 16. More particularly, a layer of chrome at a thickness of about 1,000 angstroms is sputter deposited onto the upper surface of the nickel-phosphorous alloy, to provide an underlayer 50 for the recording layer. A recording layer 52, which can be a cobalt nickel alloy, a cobalt chromium alloy or the like, is sputtered onto the chromium layer to a thickness of about 500 to 700 angstroms. Finally a protective layer 54, for example carbon, is deposited onto the recording layer at a thickness of about 300 angstroms.

As noted above process parameters primarily controlling individual laser spots are the peak energy or intensity, and pulse duration, with the angle of approach and focus also contributing to the size and shape of any discontinuity. A typical spot formed by laser 44 when vertically oriented is shown in FIG. 4 and represented in profile in FIG. 5 as a single laser crater or spot 56. Crater 56 is a combination of two departures from a specular surface plane 58 (FIG. 5) which can be considered the nominal plane of substrate surface 48, in this case the upper surface of nickel-phosphorous alloy layer 40. The first of these is a center depression or pit 60, with the other being a substantially circular rim or ridge 62 surrounding the pit. The height of rim 62 above nominal surface plane 58, h in FIG. 5, is preferably in the range of from 0.5 to 0.8 microinches, although a head contact area in which rim heights slightly exceed a microinch still ca perform satisfactorily. The depth of pit 60 below plane 58, d in FIG. 5, is typically about twice the rim height. Thus the surface roughness h of head contact area 32 is within a range of from 0.5 to 1.0 microinches. Finally, the diameter of spot 56, which is equivalent to the diameter of rim 62 and represented as D in FIG. 5, usually is in the range of 0.1 to 4.0 mils.

The process parameters mentioned above can be varied to influence dimensions D, d and h. The rim height h is considered the most critical, and varies with peak power over a preferred range from about 0.1 kilowatts to about 5 kilowatts. The optimum peak power can of course vary with the particular laser employed, as well as the nature of the surface being textured. However, in connection with nickel- phosphorous layer 40, it has been found advantageous to operate toward the low end of the 0.1–5 kilowatt range, just above a point at which melting occurs.

Depth d of pit 60, while not as critical as the height h of rim 62, nonetheless serves a useful purpose, namely the entrapment and collection of media fragments, head fragments or other debris generated due to head/disc contact. Further, in connection with fluorocarbon lubricant coatings with tendencies toward liquid behavior, the center depressions retain the lubricant coating when the disc is stopped. However, it is believed that as the disc begins spinning, the lubricant tends to travel upwardly out of the depressions and cover the rims, thus reducing dynamic friction in the head contact area.

Another useful feature of the invention is the rounded nature of the contours forming the pit and rim, with the rounded rims in particular contributing to substantially enhanced friction and wear characteristics over the long term. The rounded contours are believed to result from the flow of material due to surface tension forces while the material is cooling, while returning to the solid from the liquid state. When beam 46 is fired upon the upper surface of nickel-phosphorous layer 40, the alloy absorbs heat which initially is concentrated in what later becomes the pit. Heat is rapidly dissipated in all directions radially away from the center, principally by conduction. Near the center, the amount of heat is sufficient to momentarily melt the alloy. The alloy soon cools and solidifies, but not before material is drawn outwardly away from the spot center to form the center depression as well as the surrounding rim, apparently due to surface tension. The rounded contours are substantially and measurably more resistant to wear from contact with the transducing head.

For controlling the macro texture i.e. the pattern or arrangement of spots, it has been found satisfactory to rotate disc 16 at a rate of from about 10 to about 100 rpm, along with controlling the Q switching rate of laser 44 for a firing frequency over a range of from about 5 kilohertz to about 20 kilohertz. A satisfactory pitch or inter-ring spacing ranges from about 0.25 to 4.0 mils, while a preferred range is from 0.5 to 1.0 mils.

A desired result of parameters chosen within these ranges is the enlarged portion of head contact area 32, illustrated in FIG. 6. The spacing between adjacent spots in the radial direction (pitch), and the circumferential spacing between adjacent spots, are approximately equal to and can even be less than the average spot diameter of about 1 mil. The result is a substantially uniform, continuous texture comprised almost entirely of center depressions and raised rims about the depressions. The following examples are of approaches within the prescribed texturing parameter ranges.

EXAMPLE 1

An aluminum rigid disc, having a diameter of 8 inches and a thickness of 0.075 inches, was plated with a nickel-phosphorous alloy to a thickness of about 400 microinches. The laser was operated in the fundamental mode (designated $TEM_{00}$) and a current of 16.5 milliamperes was applied to the laser, to generate peak power of 0.2 kilowatts. The Q switching rate of the laser was maintained at 12 kilohertz, with a pulse duration of about 100 nanoseconds, while the disc was rotated at a rate of 25 rpm. The result was a circumferential ring in which adjacent laser spots nearly touched one another, spaced apart by a distance approximately equal to the average spot diameter. After each revolution of the disc, laser 44 was stepped or translated radially of the disc by a pitch of 0.8 mils. 200 concentric rings were formed, creating an annular head sector or band with a width, in the radial direction, of 160 mils. Individual spots in the band were observed using a WYKO-3D surface profilometer (phase shifting interferometer), available from WYKO corporation of Tucson, Arizona. The typical and predominant laser spot had a ridge extended from about 0.5 to 0.8 microinches above the nominal surface, and a center depression with a depth of about 1.0 to 2.0 microinches below the nominal surface plane. The average spot diameter was 0.8 mils.

EXAMPLE 2

A nickel-phosphorous alloy was plated onto an aluminum disc as in Example 1, and textured as in Example 1 except that at laser 44 was powered by a current of 17.5 milliamperes. The resulting spots had ridges from about 1.0 to 2.0 microinches above the nominal surface, with depressions of about 4.0–5.0 microinches below the nominal surface, with an inter-track pitch of 0.8 mils.

EXAMPLE 3

A nickel phosphorous layer was plated onto an aluminum disc and textured as in Example 1, except that laser 44 was powered by a current at 17.5 milliamperes, and the inter-track pitch was 1.0 mil. The spot structure was similar to that in Example 2.

EXAMPLE 4

A nickel phosphorous layer was plated onto an aluminum rigid disc and textured as in Example 1, except that the inter-ring pitch was reduced to 0.5 mils and the total width of the area was 150 mils. Adjacent spots touched one another, with typical spots having ridges raised about 0.6 microinches and center depression depths of about 1.2 microinches.

While the generally circular spot configuration is obtained with a vertically or perpendicularly oriented laser beam, the laser beam may be directed onto disc 16 at an inclined angle, e.g. 45 degrees from the horizontal. The result is an elongation of each spot into an elliptical or oval shape. When the beam is tilted yet maintained in a vertical plane containing the disc radius, and when the disc rotational speed and firing frequency are matched to provide a circumferential distance between spots approximating the spot diameter, the result is a circumferential ring of adjacent, elongated spots 64 as illustrated on a substrate 66 in FIG. 7.

It is to be appreciated that the control parameters can be varied to provide alternatives to the previously discussed patterns, e.g. varying the inter-ring pitch so that it increases in the radially outward direction, staggering adjacent rings so that spots in each ring correspond to regions between spots in its next adjacent rings, random arrangement of spots, and arrangements in which the laser peak power or spot frequency is progressively decreased for radially outward rings in order to progressively decrease roughness in the radially outward direction in the head contact band.

FIG. 8 shows a substrate 63 with a mechanically textured substrate surface. Depending upon the size of grit selected and the nature of the paper or cloth supporting the grit, the substrate surface can be textured to a selected roughness to provide a head contact sector dedicated to contact with the transducing head. In sharp contrast with FIGS. 4–7, however, FIG. 8 reveals that the surface of substrate 63 has an acicular topography characteristic of mechanical texturing. The textured surface includes peaks 65 and indentations or valleys 67, irregular in height and depth and characterized by steep slopes and pointed edges or ends.

Furthermore, the pointed edges are areas of stress concentration due to the cutting action of the grit. Consequently, the tips of the highest peaks are susceptible to being broken away when contacted by a transducing head moving relative to the substrate. As indicated in the figure, an upper tip 69 of one of the peaks has been broken away to leave a more planar though not necessarily horizontal upper surface 71.

Once the tips have been broken away from a multiplicity of such peaks, two problems arise, both of which hamper the long term reliability of the recording system. First, the multiplicity of generally flat surfaces like 71 (rather than the original pointed tips) increases the overall area of surface contact with the transducing head, increasing the stiction and friction problems (commonly referred to as friction build-up). Secondly, the multiple broken away tips tend to adhere to the transducing head as they break away, build-up in valleys 67 and expose the magnetic layer in peak regions for possible corrosion sites, or remain free as particulate contaminate, in any case reducing the reliability of the recording system.

Figure 9:
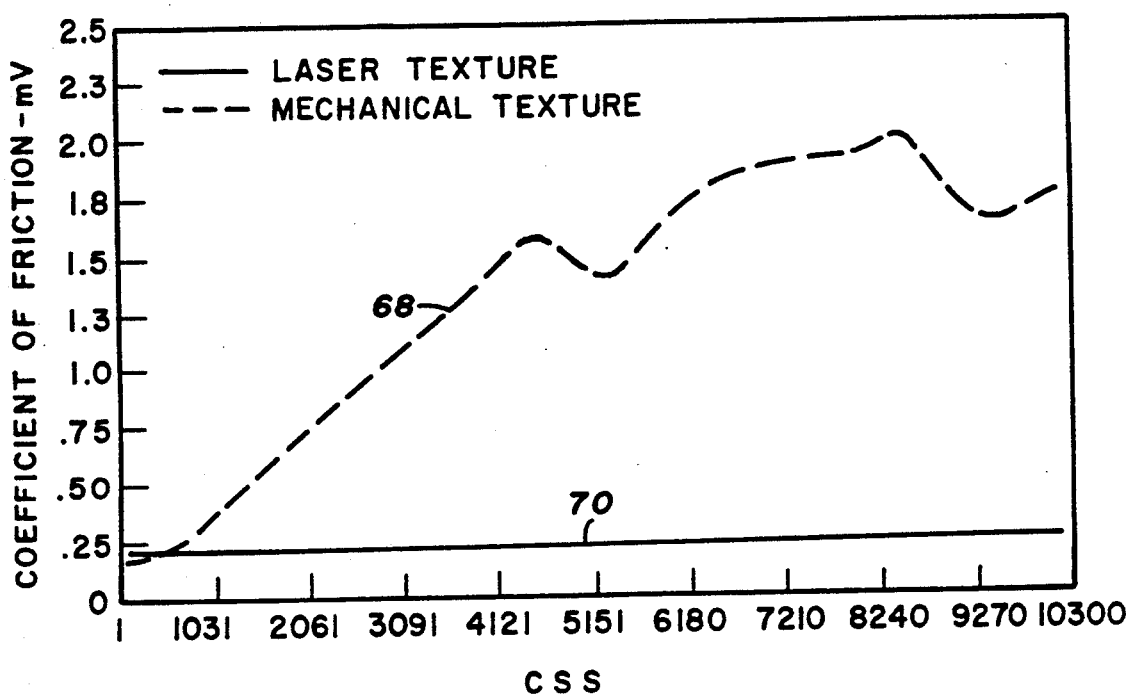
FIGS. 9 and 10 are charts illustrating comparative coefficients of friction and self-excited head/gimbal energy, respectively, for surfaces textured in accordance with the present invention as compared to conventionally textured surfaces.
Figure 10:
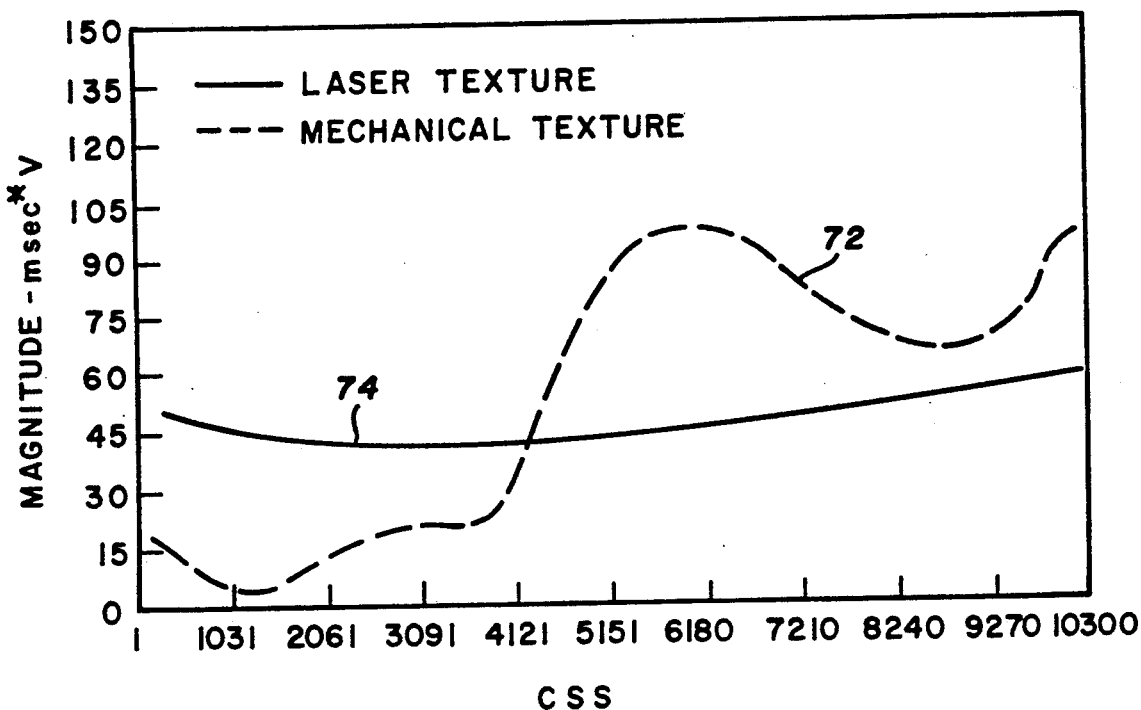

The charts in FIGS. 9 and 10 represent comparisons of mechanically textured discs with discs textured by a laser in accordance with the present invention. More particularly, mechanically textured discs and laser textured discs were compared both initially and at various stages of contact start-stop testing. All discs were provided with a 300 angstroms thick protective layer of sputtered carbon. In connection with these figures, it should be noted that actual test results would appear as a series of vertical bars indicating ranges. The line in each Figure represent a series of midpoints of such vertical bars.

As seen in FIG. 9, all of the discs initially had a coefficient friction of about 0.25. In the case of mechanically textured discs, represented by the broken line 68, the coefficient of friction was well above 1.0 by 3,000 contact start-stop cycles, and was close to 2.0 after about 10,000 cycles. In contrast, the coefficient of friction for the laser textured discs remained at about 0.25, as indicated by solid line 70. As the coefficient of friction is the principal indicator of wear to the head and head contact surface of the disc, the results shown in FIG. 9 demonstrate a surprising durability in the head contact area when textured in accordance with the present invention.

FIG. 10 also illustrates a comparison of mechanically textured and laser textured discs over numerous contact start-stop cycles, in this case comparing the envelope of self-excited head gimbal arm vibration. The self-excited head/gimbal arm vibration energy is defined as the energy spent at the head/disc interface from the time the head overcomes the stiction force to free flying during the start-stop testing. It is measured by integrating the strain experienced by the head arm, measured here by a capacitance probe, over the aforementioned time period. This value, measured as the transducing head takes off from the head contact area when the disc is being accelerated from stop, predicts future wear to the head and head contact region of the disc. As seen from a comparison of broken line 72 representing mechanically textured discs and solid line 74 representing laser textured discs, the mechanically textured discs initially exhibited a lower reading, but surpassed the laser textured discs well before 5,000 contact start-stop cycles, and thereafter remained above the laser textured discs. Again, a substantially longer useful life is indicated for both heads and disc contact surfaces, when such surfaces are textured to provide smooth, rounded contours in accordance with the present invention.

Further as to both FIGS. 9 and 10, it was found that not only are the average values for coefficient of friction and envelope of self-excited head gimbal arm vibration improved in the case of laser textured discs, but that ranges of these values remain substantially uniform over numerous contact start-stop cycles, indicating that laser texturing leads to a more reliable head/disc interface. By contrast, in the case of mechanically textured discs, the range of values widens as the number of contact start-stop cycles increases, i.e. the aforementioned vertical bars indicating ranges become longer.

While the preferred embodiments of the invention contemplate a rigid disc in which the transducing head during reading and recording operations is spaced apart from the disc by an air bearing, flexible media can likewise be textured in accordance with the present invention. The principal difference is that a flexible disc or tape remains in contact with the transducing head at all times, and thus substantially the entire surface of such disc, rather than a limited head contact band, is textured.

Thus, whether media textured in accordance with the present invention is flexible or rigid, a substantial and surprising increase in durability is achieved, measurable principally in its ability to maintain a relatively low coefficient of friction even after numerous contact start-stop cycles, e.g. 10,000 or more. It is believed that the smooth, rounded contours of the surface discontinuities are a major contributing factor to increased durability.

A further factor is the improved control of the texturing process, yielding a high degree of uniformity in surface roughness throughout the specially textured surface. The laser is a preferred device for the controlled texturing, but other alternatives, for example photolithography, plating or etching to achieve smooth and rounded contours, may be employed to texture surface areas in accordance with the present invention.

In connection with rigid discs and flying heads, the present invention affords the added advantage of providing a surface area dedicated to contact with the transducing head during accelerations, decelerations and with the disc at rest. Substantially all of the remaining disc surface area can have a specular finish ideally suited for reading and recording data.

What is claimed is:

1. A process for manufacturing magnetic media operated in conjunction with magnetic transducing heads for the recording and reading of magnetic data, including the steps of:

forming a specular substrate surface on a non-magnetizable substrate body, said substrate surface being substantially planar and having a nominal roughness;

depositing a magnetizable film over said substrate surface as a layer substantially uniform in thickness to provide a recording surface; and concentrating radiant energy selectively upon a plurality of locations over a treatment area on a selected one of said substrate surface and recording surface, to controllably alter the topography of the selected surface at each of the locations, adjacent locations being spaced apart from one another a distance substantially less than the length dimension and width dimension of a magnetic transducing head positioned proximate said magnetic film for recording and reading magnetic data, the roughness of said selected surface throughout said treatment area being at least twice said nominal roughness.

2. The process of claim 1 wherein:
said radiant energy is pulsed laser energy, and forms laser marks comprising rounded depressions in the selected surface at said locations.

3. The process of claim 2 wherein:
said treatment area consists of a designated region of said selected surface comprising less than ten percent of the surface area of the selected surface.

4. The process of claim 3 wherein:
the substrate is a disc, and said step of concentrating energy includes the substeps of:
(a) rotating the disc at a controlled rotational velocity;
(b) simultaneously providing said pulsed laser energy at a controlled frequency corresponding to the rotational velocity to form a first ring comprised of a series of said depressions;
(c) after forming said ring, displacing said laser radially relative to the disc.
(d) providing said pulse laser energy at said controlled frequency while rotating said disc at said rotational velocity to form a subsequent ring comprised of a subsequent series of said depressions concentric with the first ring and radially spaced apart from the first ring by a pitch corresponding to the amount of laser radial displacement; and (e) repeating steps (c) and (d) to form a selected number of concentric rings, whereby said designated region is an annular band.

5. The process of claim 4 wherein:
the width dimension of said transducer is aligned substantially radially of the disc, and said band has a width in the radial direction at least as great as said transducer width.

6. The process of claim 3 wherein:
said step of concentrating energy includes the substeps of:
(a) moving said substrate at a controlled velocity in longitudinal direction;
(b) simultaneously directing a beam of said pulsed laser energy upon said surface at a controlled frequency to form a first row of said depressions;
(c) displacing said beam transversely a selected pitch, and providing said beam of laser energy while longitudinally moving said substrate, to form a subsequent row of said depressions parallel to the first row; and
(d) repeating step (d) a selected number of time to form the designated region as a longitudinal band of a selected transverse width.

7. The process of claim 2 wherein:
said step of concentrating energy is performed on the substrate.

8. The process of claim 7 wherein:
said substrate body is substantially rigid and is formed of aluminum.

9. The process of claim 8 wherein:
said substrate body further includes a layer of a nickel-phosphorous alloy plated onto the aluminum, as a layer substantially uniform in thickness, said substrate surface being a surface of the nickel-phosphorous alloy layer.

10. The process of claim 2 including the further step of:
depositing a protective cover layer over said magnetizable film, said cover layer having a substantially uniform thickness and replicating the surface contours of said magnetizable film.

11. The process of claim 10 including a further step of:
depositing a non-magnetizable underlayer on said substrate surface prior to depositing said magnetizable film over said substrate surface, said non-magnetizable underlayer having a substantially uniform thickness and replicating the surface contours of the substrate surface.

12. The process of claim 1 wherein:
said radiant energy forms, at each of said locations, a rounded central depression extending inwardly of a nominal surface plane of the selected surface, and a generally circular and rounded rim surrounding the central depression and extending outwardly of the nominal surface plane.

13. The process of claim 12 wherein:
said step of concentrating energy includes selecting said locations to distribute the depressions generally uniformly over the designated area.

14. The process of claim 13 wherein:
said step of concentrating energy further includes forming said depressions over at least one-half of the designated region.

15. The process of claim 1 wherein:
said treatment area comprises substantially all of said selected surface.

16. A process for manufacturing a magnetic disc normally operated in controlled spaced apart relation to a magnetic transducing head for recording and reading magnetic data, including the steps of:

forming a substantially planar outer substrate surface on a rigid, non-magnetizable substrate;

depositing a non-magnetizable underlayer on said substrate at a generally uniform thickness to provide an outer underlayer surface substantially parallel to said substrate surface;

depositing a magnetizable film over said non-magnetizable underlayer, said magnetizable film having a substantially uniform thickness to provide an outer film surface substantially parallel to said underlayer surface;

forming a non-magnetizable cover layer over said magnetizable film, said cover layer having a substantially uniform thickness to provide an exposed outer cover surface substantially parallel to said film surface; and concentrating energy upon multiple locations over a selected one of said outer surfaces to form a mark comprising an inwardly extended depression and an outwardly extended rounded rim surrounding the depression at each of the locations, thereby to increase the surface roughness of said selected surface throughout a selected treatment area thereof from a nominal value of at most 0.1 microinches to an enhanced value of at least 0.2 microinches.

17. The process of claim 16 wherein:

said selected surface is the substrate surface, and said steps of depositing the underlayer, the magnetizable film and the cover layer are performed in succession after the step of concentrating energy on the substrate surface.

18. The process of claim 17 wherein:

the step of concentrating energy upon the substrate surface includes the substeps of:

(a) rotating the disc at a predetermined rotational velocity;

(b) simultaneously directing a pulsed beam of laser energy upon said substrate surface to form a multiplicity of the marks, one mark corresponding to each of said locations; and (c) varying the radial position of said substrate surface to which said laser energy beam is directed.

19. A process for manufacturing magnetic media operated in conjunction with magnetic transducing heads for the recording and reading of magnetic data, including the steps of:

forming a specular substrate surface on a non-magnetizable substrate body, said substrate surface being substantially planar and having a nominal roughness;

depositing a magnetizable film over said substrate surface as a layer substantially uniform in thickness to provide a recording surface; and concentrating energy selectively upon a plurality of locations over a treatment area on a selected one of said substrate surface and recording surface, to form at each said location a rounded central depression extending inwardly of a nominal surface plane of the selected surface and a generally circular and rounded rim surrounding the central depression and extending outwardly of the nominal surface plane, thus to controllably alter the topography of the selected surface at each of the locations, adjacent locations being spaced apart from one another a distance substantially less than the length dimension and width dimension of a magnetic transducing head positioned proximate said magnetic film for recording and reading magnetic data, the roughness of said selected surface throughout said treatment area being at least twice said nominal roughness.

* * * * *